(12) United States Patent
Takamasu et al.

(10) Patent No.: US 8,306,787 B2
(45) Date of Patent: Nov. 6, 2012

(54) METHOD OF EVALUATING PRECISION OF OUTPUT DATA USING ERROR PROPAGATION

(75) Inventors: Kiyoshi Takamasu, Tokyo (JP); Satoru Takahashi, Tokyo (JP); Makoto Abbe, Tsukuba (JP)

(73) Assignee: Mitutoyo Corporation, Ibaraki (JP)

( * ) Notice: Subject to any disclaimer, the term of this patent is extended or adjusted under 35 U.S.C. 154(b) by 235 days.

(21) Appl. No.: 12/707,757

(22) Filed: Feb. 18, 2010

(65) Prior Publication Data

US 2011/0054835 A1 Mar. 3, 2011

(30) Foreign Application Priority Data

Aug. 25, 2009 (JP) ................................. 2009-194538

(51) Int. Cl.
*H04B 15/00* (2006.01)
*G06F 11/30* (2006.01)
(52) U.S. Cl. ......... 702/196; 702/181; 702/182; 702/183
(58) Field of Classification Search .......... 702/121–123, 702/181–183, 196
See application file for complete search history.

(56) References Cited

U.S. PATENT DOCUMENTS

| | | | |
|---|---|---|---|
| 7,225,104 | B2 | 5/2007 | Nara et al. |
| 2006/0149507 | A1* | 7/2006 | Nara et al. ..................... 702/185 |
| 2008/0294364 | A1* | 11/2008 | Nara et al. ....................... 702/95 |

FOREIGN PATENT DOCUMENTS

JP 2006-215011 8/2006

OTHER PUBLICATIONS

Takamasu, Kiyoshi, Introduction to Three-Dimensional Coordinate Measurement-Precision Measurement Conditions and Uncertainty of Three-Dimensional Coordinate Measurement, "Method That Makes a difference in Utilizing Three-Dimensional Coordinate Measurement Machines," The Japan Society for Precision Engineering Seminar, Dec. 2007.
Takamasu, Kiyoshi, Verification Method Based on GPS (Geometrical Product Specifications)—Interpreting Geometric Tolerance and Evaluating Uncertainty of Three-Dimensional Coordinate Measurement Machines, Design Engineering, 40(2) (2005), pp. 79-85.
Takamasu Kiyoshi, Method of Estimating Uncertainty of Three-Dimensional Coordinate Measurement Machines and Its International Standardization, Machines and Tools, 45(3)(2001), pp. 66-70.
Takamasu, Kiyoshi, Osamu Sato, Ken Shimojima, Ryoshu Furutani, Artifact Calibration of Coordinate Measurement Machines (Report 3)—Estimating Uncertainty of Measurement After Calibration, Journal of the Japan Society for Precision Engineering, 71 (7) (2005), pp. 890-894.

(Continued)

*Primary Examiner* — Phuong Huynh
(74) *Attorney, Agent, or Firm* — Greenblum & Bernstein, P.L.C.

(57) ABSTRACT

Method of evaluating precision of output data using error propagation includes performing numerical differentiation using input data in data processing, and thereby obtaining a Jacobian matrix J of the data processing; estimating variance-covariance of errors of the input data, and thereby obtaining an error matrix D of the input data; and calculating an error matrix from the Jacobian matrix J and the error matrix D of the input data, the error matrix R representing variance-covariance of errors of output data.

5 Claims, 11 Drawing Sheets

OTHER PUBLICATIONS

Takamasu, Kiyoshi, Makoto Abbe, Ryoshu Furutani, Shigeo Ozono, Estimating Uncertainty in Shape Measurement (Report 1)—Contribution of Systematic Error Caused in Calibration, Journal of the Japan Society for Precision Engineering, 67(1)(2001), pp. 91-95.

Takamasu, kiyoshi, Makoto Abbe, Ryoshu Abbe, Ryoshu Furutani, Shigeo Ozono, Estimating Uncertainty in Shape Measurement (Report 3)—Shape Deviation Model of Linear Bodies with Piecewise Polynomial, Journal of the Japan Society for Precision Engineering, 71(11)(2005), pp. 1,454-1,458.

Takamasu, Kiyoshi, Makoto Abbe, Ryoshu Furutani, Shigeo Ozono, Estimating Uncertainty in Shape Measurement (Report 2)—Contribution of Shape Deviation in Measuring Circular Bodies, Journal of the Japan Society for Precision engineering, 69(5)(2003), pp. 693-697.

Takamasu, Kiyoshi Ryoshu Furutani, Shigeo Ozono, Statistical Evaluation in Coordinate Measurement in Minimum Zone Method, Journal of the Japan Society for Precision Engineering, 64(4)(1998), pp. 557-561.

* cited by examiner

```
1     function test71
2     % of zero-order to fourth-order power spectra obtained from FFT of 8 data
3     % estimate uncertainty
4
5     % 8 data to be used
6     %
7     ii = [12 1 2 3 -5 1 -8 1]';
8
9     % calculate power spectra pp without considering errors
10    oo = fft8(ii);
11    nn = length(ii);
12    mm = length(oo);
13
14    % display input data and output data
15    disp('input data ii'); disp(ii');
16    disp('output data oo'); disp(oo');
17
18    % calculate input error matrix dd
19    % positive correlation slightly observed in close data of standard deviation tt of respective data
20    tt = 0.1;
21    dd = zeros(nn);
22    for dd = 1: nn;
23        for ll = 1: nn;
24            dd(kk, ll) = tt^2 / (1 + abs(kk - ll));
25        end;
26    end;
27
28    % calculate Jacobian matrix jj
29    jj = zeros(mm);
30    dk = tt / 100;
31    for kk = 1: nn;
32        ii1 = ii;
33        ii1(kk) = ii(kk) + dk;
34        oo1 = fft8(ii1);
35        jj(kk,:) = (oo1 - oo) / dk;
36    end;
37
38    % display Jacobian matrix jj and error matrix dd
39    disp('Jacobian matrix jj'); disp(jj);
40    disp('input error matrix dd'); disp(dd);
41
42    % calculate and display output error matrix rr
43    rr = jj' * dd * jj;
44    disp('output error matrix rr'); disp(rr);
45    disp('output standard deviation correlation coefficient'); dispvar(rr);
46
47    % calculate and display standard deviation of output data
48    rrs = zeros(1, mm);
49    for ii = 1: mm;
50        rrs(ii) = sqrt(rr(ii, ii));
51    end;
```

Fig. 8 (continued)

```
52          plot(0:mm-1, rrs)
53
54          function pp = fft8(x)
55          % calculate zero-order to fourth-order power spectra from 8 data
56          % x: 8 input data
57          % pp: 5 zero-order to fourth-order power spectra
58
59          p = fft(x, 8);
60          pp = p .*  conj(p) / 8;
61          pp = pp(1:5);
62
63          function d = dispvar(c)
64          % dispvar: display standard deviation and correlation coefficient from variance-coraviance matrix
65          % 2002-Aug by K.T.
66
67          % convert standard deviation to correlation coefficient
68          d = c;
69          for ii = 1:length(c);
70             for jj = 1:length(c);
71                if ii == jj;
72                   d(ii, jj) = sqrt(c(ii,jj));
73                else
74                   d(ii, jj) = c(ii,jj))/sqrt(c(ii,ii)) * c(jj,jj));
75                end;
76             end;
77          end;
```

Fig. 9

```
>> test71
Input data ii
     12      1      2      3     -5      1     -8      1
Output data oo
     6.1250   46.6501   21.6250   51.5999    3.1250
Jacobian matrix jj
     1.7501    3.8966    3.2501    4.6037   -1.2499
     1.7501    4.7731   -0.4999   -4.7728    1.2501
     1.7501    2.8537   -3.2499    2.1466   -1.2499
     1.7501   -0.7373    0.5001    1.7376    1.2501
     1.7501   -3.8963    3.2501   -4.6034   -1.2499
     1.7501   -4.7728   -0.4999    4.7731    1.2501
     1.7501   -2.8534   -3.2499   -2.1463   -1.2499
     1.7501    0.7376    0.5001   -1.7373    1.2501
Input error matrix dd
     0.0100    0.0050    0.0033    0.0025    0.0020    0.0017    0.0014    0.0013
     0.0050    0.0100    0.0050    0.0033    0.0025    0.0020    0.0017    0.0014
     0.0033    0.0050    0.0100    0.0050    0.0033    0.0025    0.0020    0.0017
     0.0025    0.0033    0.0050    0.0100    0.0050    0.0033    0.0025    0.0020
     0.0020    0.0025    0.0033    0.0050    0.0100    0.0050    0.0033    0.0025
     0.0017    0.0020    0.0025    0.0033    0.0050    0.0100    0.0050    0.0033
     0.0014    0.0017    0.0020    0.0025    0.0033    0.0050    0.0100    0.0050
     0.0013    0.0014    0.0017    0.0020    0.0025    0.0033    0.0050    0.0100
Output error matrix rr
     0.7633   -0.0590   -0.0191   -0.0094    0.0001
    -0.0590    1.1338    0.0487    0.0789   -0.0287
    -0.0191    0.0487    0.2624    0.0268   -0.0100
    -0.0094    0.0789    0.0268    0.4793   -0.0150
     0.0001   -0.0287   -0.0100   -0.0150    0.0535
Output standard deviation correlation coefficient
     0.8737   -0.0634   -0.0427   -0.0156    0.0003
    -0.0634    1.0648    0.0894    0.1071   -0.1167
    -0.0427    0.0894    0.5122    0.0755   -0.0847
    -0.0156    0.1071    0.0755    0.6923   -0.0936
     0.0003   -0.1167   -0.0847   -0.0936    0.2312
```

Fig. 10

1 / Distance

METHOD OF EVALUATING PRECISION OF OUTPUT DATA USING ERROR PROPAGATION

CROSS-REFERENCE TO RELATED APPLICATIONS

The present application claims priority under 35 U.S.C. §119 of Japanese Application No. 2009-194538 filed on Aug. 25, 2009, the disclosure of which is expressly incorporated by reference herein in its entirety.

BACKGROUND OF THE INVENTION

1. Field of the Invention

The present invention relates to a method of evaluating precision of output data using error propagation, particularly to a method of evaluating precision of output data using error propagation suitable for estimating uncertainty of a coordinate measurement value of a three-dimensional coordinate measuring machine (hereinafter simply referred to as a three-dimensional measuring machine or CMM).

2. Description of Related Art

In light of quality assurance, estimation of uncertainty is required for measurement results of any measurement equipment.

It is important in this regard to evaluate how precise calculation results are of complex data processing, simulations, and the like (hereinafter referred to as data processing). In the data processing, output data, which is the calculation results, is obtained based on input for calculation, such as input data, input parameters required for calculation processing, and the like (hereinafter parameters are included in input data). How much error is included the output data largely depends on how correct a calculation method or model is, based on which the data processing is performed. Even in a case in which the calculation method or model is sufficiently correct and thus correct output data can be obtained from correct input data, however, the output data has errors because of errors included in the input data. Hereinafter, data processing is assumed in which correct output data is obtained from correct input data.

Conventionally under the conditions above, an impact on the output data is observed by simply changing the input data (including parameters) by a slight amount; the output error is estimated by changing the input data with Monte Carlo simulation or experimental design; or the output data error is evaluated based on experience.

The importance of coordinate measurement using three-dimensional measuring machines has recently been increasing, in particular, in shape measurement in precision measurement. An actual shape is calculated in a least squares method, based on a plurality of measurement points measured on a shape by a three-dimensional measuring machine. In addition to uncertainty of the three-dimensional measuring machine itself, however, uncertainty changes according to measured objects, measurement environments, measurement strategies, and the like, thus making it difficult to correctly estimate the uncertainty.

The uncertainty of measurement results of three-dimensional measuring machines has conventionally been estimated in an experimental method, a method of a series of experiments, and a virtual CMM method (Monte Carlo simulation method) (refer to Related Arts 1 through 9).

[Related Art 1] Japanese Patent Laid-open Publication No. 2006-215011

[Related Art 2] Takamasu, Kiyoshi, Introduction to Three-Dimensional Coordinate Measurement—Precision Measurement Conditions and Uncertainty of Three-Dimensional Coordinate Measurement, "Method That Makes a Difference in Utilizing Three-Dimensional Coordinate Measurement Machines," The Japan Society for Precision Engineering Seminar (December 2007)

[Related Art 3] Takamasu, Kiyoshi, Verification Method Based on GPS (Geometrical Product Specifications)—Interpreting Geometric Tolerance and Evaluating Uncertainty of Three-Dimensional Coordinate Measurement Machines, *Design Engineering*, 40 (2) (2005) pp. 79-85

[Related Art 4] Takamasu, Kiyoshi, Method of Estimating Uncertainty of Three-Dimensional Coordinate Measurement Machines and Its International Standardization, *Machines and Tools*, 45 (3) (2001) pp. 66-70

[Related Art 5] Takamasu, Kiyoshi, Osamu Sato, Ken Shimojima, Ryoshu Furutani, Artifact Calibration of Coordinate Measurement Machines (Report 3)—Estimating Uncertainty of Measurement After Calibration, *Journal of the Japan Society for Precision Engineering*, 71 (7) (2005) pp. 890-894

[Related Art 6] Takamasu, Kiyoshi, Makoto Abbe, Ryoshu Furutani, Shigeo Ozono, Estimating Uncertainty in Shape Measurement (Report 1)—Contribution of Systematic Error Caused in Calibration, *Journal of the Japan Society for Precision Engineering*, 67 (1) (2001) pp. 91-95

[Related Art 7] Takamasu, Kiyoshi, Makoto Abbe, Ryoshu Furutani, Shigeo Ozono, Estimating Uncertainty in Shape Measurement (Report 3)—Shape Deviation Model of Linear Bodies with Piecewise Polynomial, *Journal of the Japan Society for Precision Engineering*, 71 (11) (2005) pp. 1,454-1,458

[Related Art 8] Takamasu, Kiyoshi, Kenichiro Nosaka, Makoto Abbe, Ryoshu Furutani, Shigeo Ozono, Estimating Uncertainty in Shape Measurement (Report 2)—Contribution of Shape Deviation in Measuring Circular Bodies, *Journal of the Japan Society for Precision Engineering*, 69 (5) (2003) pp. 693-697

[Related Art 9] Takamasu, Kiyoshi, Ryoshu Furutani, Shigeo Ozono, Statistical Evaluation in Coordinate Measurement in Minimum Zone Method, *Journal of the Japan Society for Precision Engineering*, 64 (4) (1998) pp. 557-561

Among the methods above, however, it is difficult to efficiently generate input data that include errors in a Monte Carlo simulation. Further, its calculation load is high and reliability of results is low. Other methods are not used as general evaluation methods due to experimental aspects.

For complex measurement machines, such as three-dimensional measurement machines in particular, an effective method of estimating uncertainty has yet to be established in reality because of difficulty in estimating uncertainty, cost and time of experiments, and low estimation precision.

SUMMARY OF THE INVENTION

In order to address the above-described conventional problems, a non-limiting feature of the present invention provides a method of evaluating precision of output data, the method being performed theoretically in simple calculation with a small calculation load, requiring no convergence calculation, being applicable to many software applications performing data processing, and being capable of performing a variety of analyses, such as error factor analysis, size comparison of factors, and the like.

Figure 1:
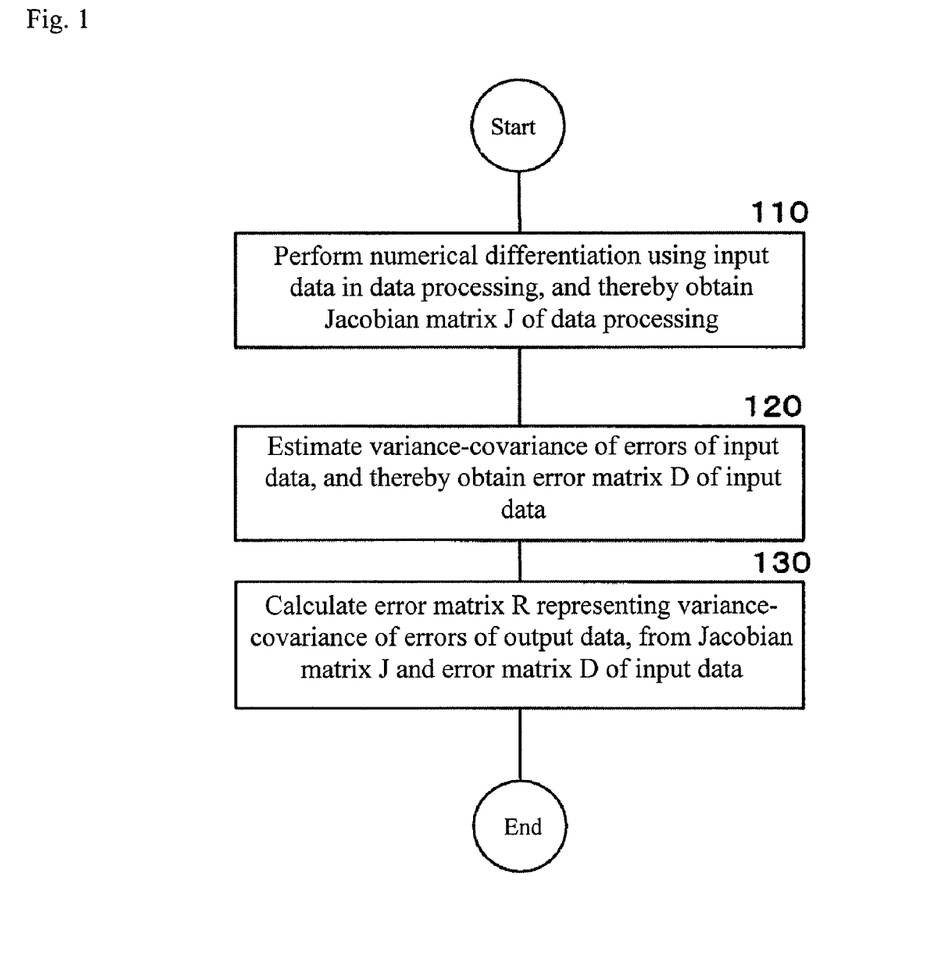
FIG. 1 is a flowchart illustrating a basic processing procedure of the present invention.

As shown in FIG. 1, a non-limiting feature of the present invention solves the above-described problems by including performing numerical differentiation using input data in data processing, and thereby obtaining a Jacobian matrix J of the data processing (Step 110); estimating variance-covariance of errors of the input data, and thereby obtaining an error matrix D of the input data (Step 120); and calculating an error matrix R from the Jacobian matrix J and the error matrix D of the input data, the error matrix R representing variance-covariance of errors of output data (Step 130).

Each step is explained below.

1. Method of Obtaining the Jacobian Matrix J of Data Processing (Step 110) In data processing, an output data string is obtained from an input data string (including input parameters). First, an input data string I that meets conditions for calculation is prepared, and then an output data string O thereof is obtained. Vector quantity of the input data is divided as scalar quantity herein. When a total quantity is n, the input data string I is expressed as a series of a scalar quantity of n. Similarly, the output data is expressed as a series of a scalar quantity of m. See the expression below.

[Expression 1]

$$I=(i_1 i_2 \ldots i_n)$$

$$O=(o_1 o_2 \ldots o_m) \quad (1)$$

Since the Jacobian matrix J of the data processing denotes a relationship between the input data having a quantity of n and the output data having a quantity of m, the Jacobian matrix J is expressed as a matrix having n rows and m columns. Element $j_{n,m}$ at row n and column n of the Jacobian matrix J can be obtained in the calculation below.

1) Only the $k^{th}$ input of the input data string I is changed by a slight amount $d_k$, and thereby an input data string $I_k$ is prepared.

2) Data processing is performed for the input data string $I_k$, and thereby an output data string O* is obtained.

3) Elements $j_{k,l}$ to $j_{k,m}$ on row k of the Jacobian matrix J can be obtained in the expression below, by using a difference of the elements of the output data strings O* and O, and $d_k$.

[Expression 2]

$$I_k = (i_1 \ldots i_k + d_k \ldots i_n) \quad (2)$$

$$j_{k,l} = \frac{o_l^* - o_l}{d_k} \quad (l = 1, \ldots, m)$$

4) Similarly, all rows (row 1 to row n) of the Jacobian matrix can be obtained.

The calculation above can be performed mechanically. Processing the data for n+1 times on the program that performs the process above automatically calculates the Jacobian matrix J.

In the process, the slight amount $d_k$ is determined taking the issues below into account.

1) When nonlinearity of the data processing is small, $d_k$ has no large impact on the results no matter how $d_k$ is determined.

2) Using an error matrix D of the input data, which is estimated in Section 2 below, can automatically determine the slight amount, by setting a small amount, such as using a fraction of square root of variance of the input data.

3) When characteristics of the input data are known to some extent, a small amount relative to the error and the like is set.

2. Estimation of the Error Matrix D of the Input Data (Step 120)

In order to estimate the error matrix D, which expresses error characteristics of the input data, error matrices are first obtained respectively for independent error factors affecting the input data, and then a sum is simply obtained. Thus, a method of obtaining an error matrix for one independent error factor is illustrated below.

When input data errors are respectively independent and a standard deviation t thereof is known, on-diagonal elements of the error matrix D are squares (variances) of the standard deviations of the respective errors, and off-diagonal elements are 0s. See the expression below.

[Expression 3]

$$D = \begin{pmatrix} t_1^2 & 0 & 0 & 0 \\ 0 & t_2^2 & 0 & 0 \\ 0 & 0 & \ddots & 0 \\ 0 & 0 & 0 & t_n^2 \end{pmatrix} \quad (3)$$

In a case in which the input data errors are not independent, when a correlation coefficient s between two input data and the standard deviation t of the errors can be estimated, a covariance can be calculated from the correlation coefficient s and the standard deviation t. On-diagonal elements of the error matrix D are squares (variances) of the standard deviations of the respective errors, and off-diagonal elements are covariances of two corresponding input data. See the expression below.

[Expression 4]

$$D = \begin{pmatrix} t_1^2 & s_{1,2}t_1t_2 & \ldots & s_{1,n}t_1t_n \\ s_{1,2}t_1t_2 & t_2^2 & \ldots & \vdots \\ \vdots & \vdots & \ddots & \vdots \\ s_{1,n}t_1t_n & \ldots & \ldots & t_n^2 \end{pmatrix} \quad (4)$$

For more complex data relationships, it is necessary to perform i) theoretical estimation; ii) Monte Carlo simulation for an portion including such relationships; and iii) estimation based on experience and other methods. It is further possible to estimate the error matrix by applying the present method to simpler input data, as shown in Section 3.

3. Calculation of the Error Matrix R of the Output Data (Step 130)

The error matrix R of the output data can be calculated in a calculation method of the expression below, based on the Jacobian matrix J and the error matrix D of the input data obtained in the methods above.

[Expression 5]

$$R = J^t D J \quad (5)$$

$J^t$ herein represents a transposed matrix of the matrix J.

A non-limiting feature of the present invention has the effects described below.

1. Use of the error matrix R of the output data

The error matrix R of the output data estimates the error of results calculated in the data processing. Element $r_{j,j}$ at row j and column j of the error matrix R represents a variance of an error of an output value $o_j$ at the $j^{th}$ of the output data string O. Thus, the output value error of the $j^{th}$ of the output data string O is a square root $t_j$ of element $r_{j,j}$ at row j and column j of the error matrix R in a standard deviation. See the expression below.

[Expression 6]

$$t_j = \sqrt{r_{j,j}} \quad (6)$$

When the input data error can be assumed to have a normal distribution, and nonlinearity of the data processing is small, it can be assumed that the output data error also has a normal distribution. In this case, the output data falls into a range of $o_j \pm t_j$ at a probability of 60%, and a range of $o_j \pm 2t_j$ at a probability of 95%. Thereby, the output data error can be evaluated.

Element $r_{j,l}$ at row j and column l of the error matrix R of the output data represents a covariance of the $j^{th}$ output and the $l^{th}$ output. From element $r_{j,l}$ and variances of output errors $r_{j,j}$ and $r_{l,l}$, respectively, a correlation coefficient $s_{j,l}$ of the two output errors can be calculated using expression (3). The correlation coefficient indicates, within a range of ±1, that no correlation exists between the two output errors when an absolute value is proximate to 0 and that positive or negative correlation is great between the two output errors when the absolute value is proximate to 1. When the correlation is great, correct evaluation can be obtained by applying the present method again to the data processing for computation of the two output values, without simply using the output values.

As described above, when the output data is used as the input data for separate data processing, the error matrix of the output data can be used as the error matrix of the input data for the subsequent data processing.

2. Use of the Jacobian Matrix J

The Jacobian matrix J represents the relationship between the input data and the output data. When only input data $i_k$ changes only by $d_k$, the change of output data $o_l$ can be evaluated by $j_{k,l} \times d_k$. When the value is sufficiently small, the input data $i_k$ hardly has any relationship with the output data $o_l$. The analysis allows extraction of a portion in which the input data and the output data are unrelated, thus enables separation of the data processing into several independent portions.

3. Relationship of the Error Matrix D of the Input Data and the Error Matrix R of the Output Data When the error matrix of the input data includes a plurality of independent error factors of a quantity of p, error matrices $D_1$ to $D_p$ for the respective factors are estimated, and then corresponding error matrices $R_1$ to $R_p$ of the output data are calculated in the expression below.

[Expression 7]

$$R = J^t(D_1 + \ldots + D_p)J = J^t D_1 J + \ldots + J^t D_p J = R_1 + \ldots + R_p \quad (7)$$

The analysis described in Section 1 can be performed for the respective Rs. In addition, comparing R sizes can determine which error factors are important.

In summary of the explanation above, conventional complex data processing or simulations mostly end in obtaining calculation results, which are not evaluated. In contrast, a non-limiting feature of the present invention uses error propagation, not a Monte Carlo simulation, thus capable of being widely applied to any data processing. A non-limiting feature of the present invention allows automatic error evaluation and a variety of analyses on the results, thus providing a strong data analysis tool.

BRIEF DESCRIPTION OF THE DRAWINGS

A non-limiting feature of the present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the present invention are explained below with reference to the drawings.

Figure 2:
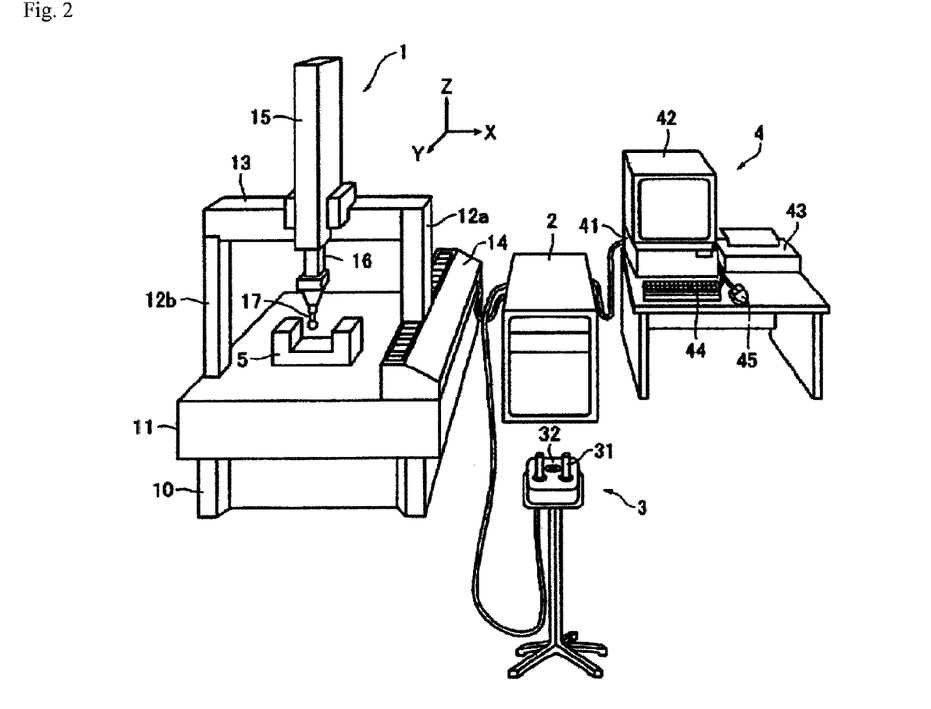
FIG. 2 is a perspective view of an exemplary three-dimensional measuring machine to which a first embodiment of the present invention is applied.

In the first embodiment of the present invention, the present invention is applied to uncertainty estimation of a three-dimensional measuring machine 1, as shown in FIG. 2.

In the drawing, a drive controller 2 drives and controls the three-dimensional measuring machine 1, and retrieves necessary measurement coordinate values from the three-dimensional measuring machine 1; a joy stick operation panel 3 allows manual operation of the three-dimensional measuring machine 1 by way of the drive controller 2; and a host system 4 edits and executes a part program that provides an instruction of a measurement procedure on the drive controller 2, performs calculation to apply a geometric shape to the measurement coordinate values retrieved by way of the drive controller 2, and records and transmits the part program.

The three-dimensional measuring machine 1 is structured as below. A platen 11 is placed on a vibration isolator 10, such that an upper surface of the platen 11 is provided as a base surface consistent with a horizontal surface. An X-axis guide 13 is supported by upper end portions of arm supporters 12a and 12b, which stand from both side end portions of the platen 11. A lower end of the arm supporter 12a is driven in a Y-axis direction by a Y-axis drive mechanism 14. A lower end of the arm support 12b is supported on the platen 11 movably in a Y-axis direction by an air bearing. A Z-axis guide 15 extending in a vertical direction is driven by the X-axis guide 13 in an X-axis direction. A Z-axis arm 16 is provided to the Z-axis guide 15, so as to be driven along the Z-axis guide 15. A contact-type probe 17 is mounted to a lower end of the Z-axis arm 16. When the probe 17 is contacted with a work 5 placed on the platen 11, a touch signal is output from the probe 17 to the drive controller 2, which then retrieves an XYZ-axis coordinate value at the time.

1. Overview of a Basic Method

Figure 3:
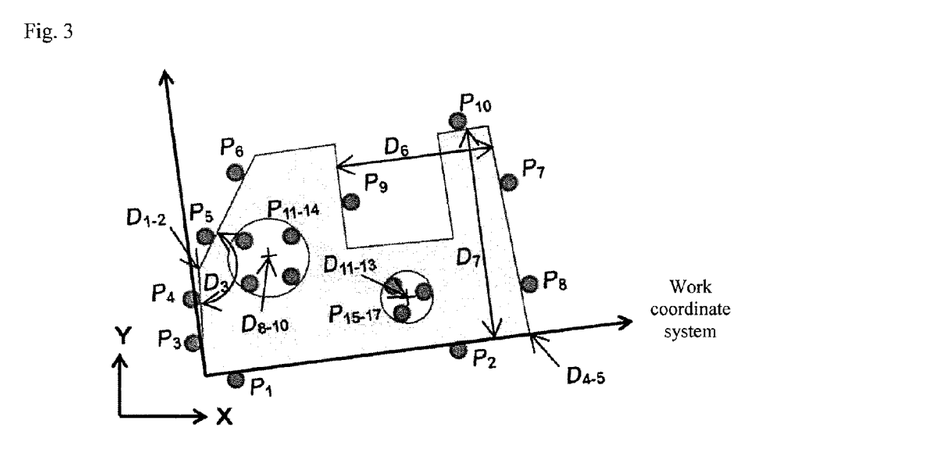
FIG. 3 illustrates a relationship between measurement points and measurement values (a two-dimensional example) according to the first embodiment.

A method, which is explained below with reference to FIG. 3 using a two-dimensional example, is easily expanded to three-dimension. In FIG. 3, $P_1$ to $P_{17}$ represent measurement points, and $D_1$ to $D_{13}$ represent measurement values. In the example, a work coordinate system is set with $P_1$ to $P_4$; and measurement is made with $P_5$ to $P_8$ for locations of two points and angles of sides, $P_9$ and $P_{10}$ for locations of sides; and $P_{11}$ to $P_{14}$ and $P_{15}$ to $P_{17}$ for centers and diameters of two circles. With respect to the measurement values, for example, $D_1$ and $D_2$ represent an X coordinate and a Y coordinate of a point, respectively; $D_3$ represents an angle between two sides; and $D_8$, $D_9$, and $D_{10}$ represent an X coordinate and a Y coordinate of the center and the diameter of the circle, respectively.

Figure 4:
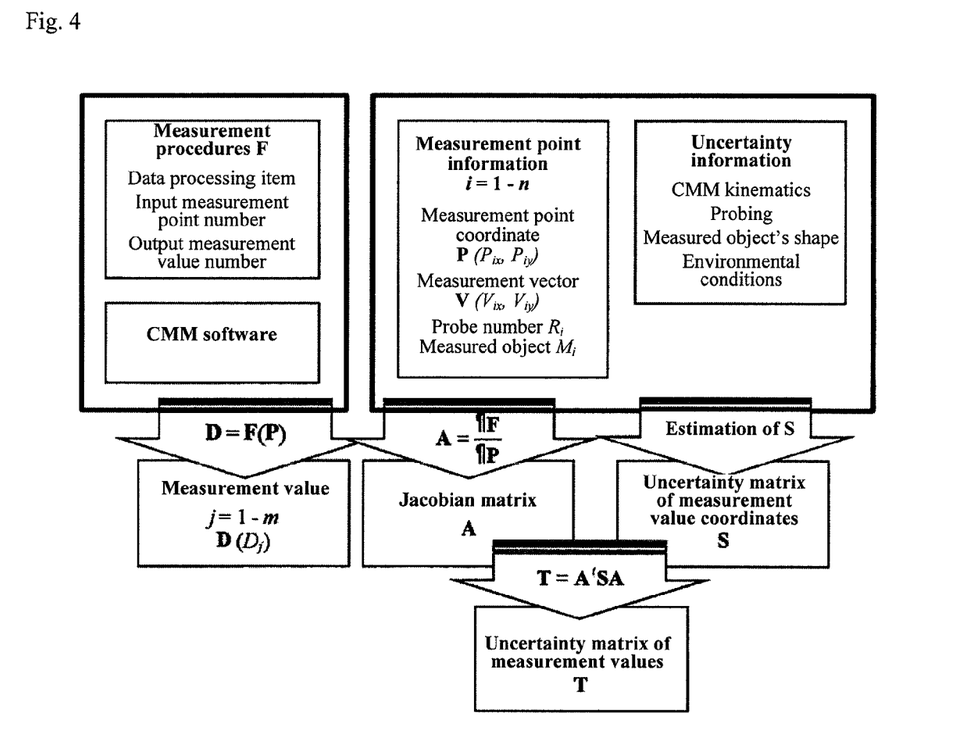
FIG. 4 illustrates a basic flow of uncertainty estimation using software error propagation according to the first embodiment.

In the present embodiment, measurement uncertainty is estimated principally based on error propagation, as shown in FIG. 4. As shown in the expression below, the measurement values D can be obtained by inputting measurement point coordinates P as output of measurement processing software (hereinafter referred to as measurement software) F.

[Expression 8]

$$P=(P_{1x}P_{1y}\ldots P_{nx}P_{ny})^t$$

$$D=(D_1\ldots D_m)^t$$

$$D=F(P) \quad (8)$$

Partially differentiating the software with P as shown in the expression below calculates a Jacobian matrix A.

[Expression 9]

$$A = \frac{\partial F}{\partial P} \quad (9)$$

The measurement software is used as a black box in the calculation. Thus, no matter what the measurement software is, it is sufficient to provide measurement point coordinates as input and measurement values as output off line. When an uncertainty matrix S of the measurement point coordinates can be estimated, uncertainty of the measurement values can be calculated in the expression of error propagation below.

[Expression 10]

$$T=A^tSA \quad (10)$$

The Jacobean matrix A can be mechanically calculated by expression (9), using the software off line. A method of calculating the Jacobian matrix will be described hereinafter.

A key technology in the method is thus estimation of the error matrix S. It is simple when uncertainties of the measurement point coordinates are mutually independent and similar, but estimation ends up being low level. As described in Section 3 hereinafter, the error matrix is estimated as close as to reality by analyzing many uncertainty factors.

When the Jacobian matrix A can be calculated and the uncertainty matrix S can be estimated, an uncertainty matrix T (variance and covariance of the respective measurement points) of the measurement point values D can be calculated in expression (10). It should be noted that the form of expression (10) is different in a case in which F is an observation equation. When F is an observation equation, an input of F is a measurement value, but an output is a deviation from a shape to be obtained, not a measurement result. A result obtained by solving in a least square method so as to minimize a square sum of the deviation is equal to F herein. When a Jacobian matrix B is provided in a case in which F is the observation equation, the expression is At $=(B^tS^{-1}B)^{-1}B^tS^{-1}$. Since a program of general three-dimensional measuring machines does not take S into account when solving in the least square method, it is actually $A=(B^tB)^{-1}B$.

2. Estimation of the Jacobian Matrix

The Jacobian matrix A is obtained, as shown in the expression below, by obtaining a numerical difference with respect to a relationship of X coordinate $P_{ix}$ and Y coordinate $P_{iy}$ of each of the measurement points $P_i$, and the measurement values $D_j$.

[Expression 11]

$$A = \frac{\partial F}{\partial P} = \begin{pmatrix} a_{1,1} & \cdots & a_{1,mP} \\ \vdots & \ddots & \vdots \\ a_{2n,1} & \cdots & a_{2n,m} \end{pmatrix} \quad (11)$$

$$D_{ix} = F(P_{1x} \ldots P_{ix}+d \ldots P_{ny})$$

$$a_{2i-1,j} = \frac{D_{j,ix}-D_j}{d}, \quad a_{2i,j} = \frac{D_{j,iy}-D_j}{d}$$

Thereby, the measurement procedures and software portions can be handled as the black box F. Conventionally, theoretical calculation or a Monte Carlo method has been employed for calculation. However, the measurement procedures and software portions are performed in off-line mode (virtual measurement mode using no three-dimensional measuring machine), and thus handled as the black box. Since the calculation below can be performed mechanically, there is no theoretical difficulty.

The Jacobian matrix A denotes uncertainty of the measurement point coordinates and propagation of the measurement value uncertainty. Thus, the Jacobian matrix A is a matrix of 2n rows and m columns, corresponding to measurement values of n (coordinate values of 2n since the example is two dimensional) and measurement values of m. Since n=17 and m=13 in the example of FIG. 3, the Jacobian matrix A is a matrix of 34 rows and 13 columns. An actual measurement coordinate of the $i^{th}$ measurement point $P_i$ is ($P_{ix}$, $P_{iy}$), and the $j^{th}$ calculated measurement value is $D_j$. Only the X coordinate of the $i^{th}$ measurement point is increased only by d off line, and thereby the coordinate of $P_i$ is ($P_{ix}$+d, $P_{iy}$). The same calculation is then performed, and a calculated measurement value is provided as $D_{j,ix}$. From the calculation, elements on row 2i-1 of the Jacobian matrix A can be calculated as $(D_{j,ix}-D_j)/d$.

Actual measurement coordinates do not need to be measured with a three-dimensional measuring machine, and nominal values (values provided on a drawing, for example) may be used. Further, it is important to use a sufficiently small value for the d value, within a range in which a numerical error is not a problem. Generally, a value of 0.000000001 mm may be used, for instance.

Performing the above-described calculations for the X coordinate and the Y coordinate of each of the measurement points provides the Jacobian matrix A. In this case, the software is retrieved for 2i times. Since the software is partially independent in reality, not all calculations need to be repeated. A method of determining software independency, however, will be dealt with in the future. Once the Jacobian matrix is calculated, independent portions of the software can automatically be extracted by identifying covariance of the Jacobian matrix.

3. Estimation of the Uncertainty Matrix of the Measurement Point Coordinates

The key technology of the proposed method is to estimate uncertainties of the X coordinates and the Y coordinates of the respective measurement points (variance), and relationships among the measurement point coordinates (covariance). The factors below are first considered as the uncertainties of the measurement point coordinates. Some of the factors are already formulated.

(1) Uncertainty due to CMM kinematic correction
(2) Uncertainty due to probing (probing, probing correction, and probing exchange)
(3) Uncertainty due to shape deviation of a measured object
(4) Uncertainty due to a measurement environment (temperature drift and the like)

A basic concept is to obtain uncertainties contributed by respective factors and to estimate covariance from correlation coefficients which the factors provide to respective coordinate values. An overview of a method of estimating variance and covariance for each individual factor is provided below.

(1) Uncertainty Due to CMM Kinematic Correction

Although a CMM performs correction based on kinematics, there exists uncorrectable uncertainty, including random uncertainty of high frequency and uncertainty associated with correlation between low frequency coordinates. It is considered that no correlation between X coordinates and Y coordinates needs to be taken into account for the uncertainty. Coordinate uncertainty has a constant value at any position. Further, correlation between two coordinates is a function of an absolute value of a difference of two coordinates (refer to Related Art 5).

First of all, uncertainty $s_{cmm}$ is provided to an X coordinate and a Y coordinate of each of the measurement points. Correlation $r_{cmm}$ ($|P_{hx}-P_{ix}|$) is provided based on an absolute value of a difference of coordinates between two measurement points h and i. Correlation between the X coordinate and the Y coordinate is 0. Uncertainty $s_{cmm}$ and correlation $r_{cmm}$ are estimated from an MPE diagram of maximum tolerance in length measurement on the CMM or from measurement result, such as of a step gauge and the like.

Figure 5:
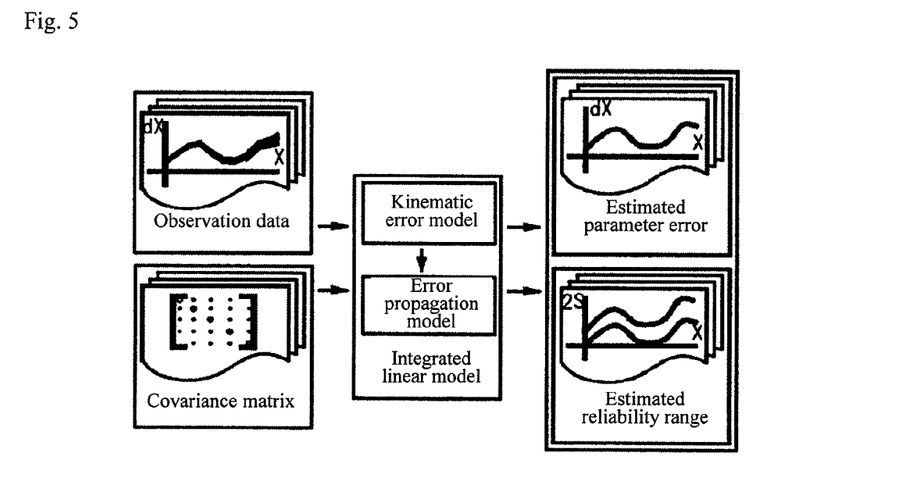
FIG. 5 illustrates a concept of uncertainty due to kinematics of the three-dimensional measuring machine according to the first embodiment.

A concept of the uncertainty due to CMM kinematics is shown in FIG. 5.

(2) Uncertainty Due to Probing (Probing, Probing Correction, and Probing Exchange)

Uncertainty due to probing includes random uncertainty and uncertainty dependent on a measurement direction of measurement vector. When two points are measured with the same probe, correlation of the uncertainty due to probe correction can be described as a function of a difference of two measurement vector directions (refer to Related Art 6).

Uncertainty $s_p$ is first provided for probing. Correlation $r_p(V_h \cdot V_i)$ is provided in association with an angle formed by measurement vectors of two measurement points h and i, including probe radius correction. The values can be estimated from theoretical observation and $s_{cmm}$ and $r_{cmm}$ of (1).

Figure 6:
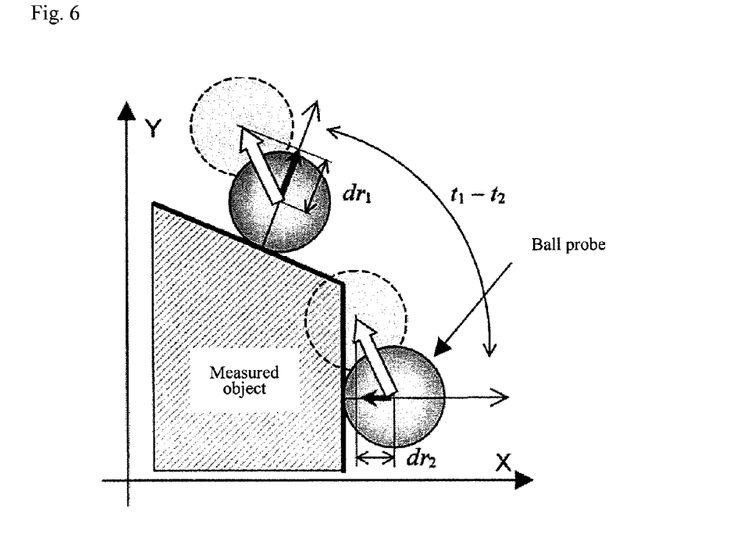
FIG. 6 illustrates estimation of error due to probing according to the first embodiment.

Estimation of the uncertainty due to probing is shown in FIG. 6.

(3) Uncertainty Due to Shape Deviation of a Measured Object

When a measured object has a shape deviation, there are random uncertainty of the shape deviation and uncertainty due to self correlation of the shape. When an object having the same two points is measured, correlation of the uncertainty can be described as a function of a measurement vector direction and a measurement position (refer to Related Arts 7 and 8).

Further, measurement point uncertainty $s_f$ and correlation $r_f$ can be estimated from the random error and correlation of the shape deviation (refer to Related Arts 7 and 8). For a circle, correlation $r_f$ is determined by a difference of angle positions of the measurement points on the circle estimated from the measurement vectors. For a line, correlation $r_f$ is determined by a difference of positions of the measurement points on the line.

Figure 7:
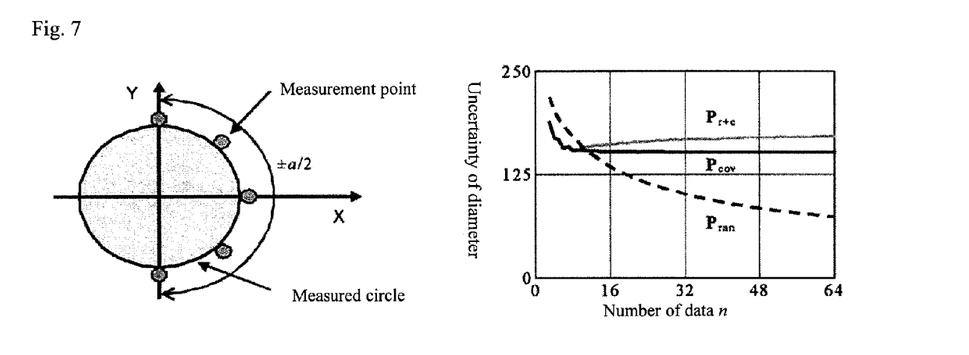
FIG. 7 illustrates uncertainty due to shape deviation of a circular body according to the first embodiment.

Uncertainty due to the shape deviation of the circular body is shown in FIG. 7.

(4) Uncertainty Due to a Measurement Environment (Temperature Drift and the Like)

It is difficult to evaluate uncertainty caused by an environment. It is considered, however, that uncertainty caused by environmental changes, such as temperature drift and the like, is evaluated as a function of time. When a measurement time difference of two measurement points is large, the environment changes, and thus the correlation is low. On the other hand, when two measurement points are measured consequently, the environmental correlation is high, and thus the uncertainty due to the environment is offset.

In the present embodiment, the method of estimating uncertainty of measurement results from error propagation based on the Jacobian matrix and the uncertainty matrix is provided. Thus, theoretically high estimation precision is expected. In addition, the Jacobian matrix calculation method can be performed with numerical differences using the software as a black box. The method is thus performed at a high speed and at a high precision, requiring no experience or experiment. Further, the method of estimating the uncertainty matrix of measurement coordinates is based on theoretical analysis and covers many factors. The method thus eventually provides high estimation precision of the uncertainty of measurement results. Furthermore, the method of estimating the uncertainty matrix of measurement coordinates is a theoretical method, thus hardly requiring experiments and the like and achieving a low cost and a fast estimation time.

The six factors below can also be considered as estimation factors of the uncertainty matrix S of measurement points.

(1) Uncertainty due to squareness error of the three-dimensional measuring machine $S_1$
(2) Uncertainty due to scale error of the three-dimensional measuring machine $S_2$
(3) Uncertainty due to kinematic error of the three-dimensional measuring machine, other than squareness error and scale error $S_3$
(4) Uncertainty due to probing $S_4$
(5) Uncertainty due to shape deviation of a measured object $S_5$
(6) Uncertainty due to a measurement environment (temperature drift and the like) $S_6$ The second embodiment is explained below in which the present invention is applied to Fourier transform.

In the second embodiment, eight data undergo Fourier transform, and thereby first-order to fourth-order power spectra are obtained. When the data include errors herein, error of the obtained power spectra is estimated.

Figure 8:
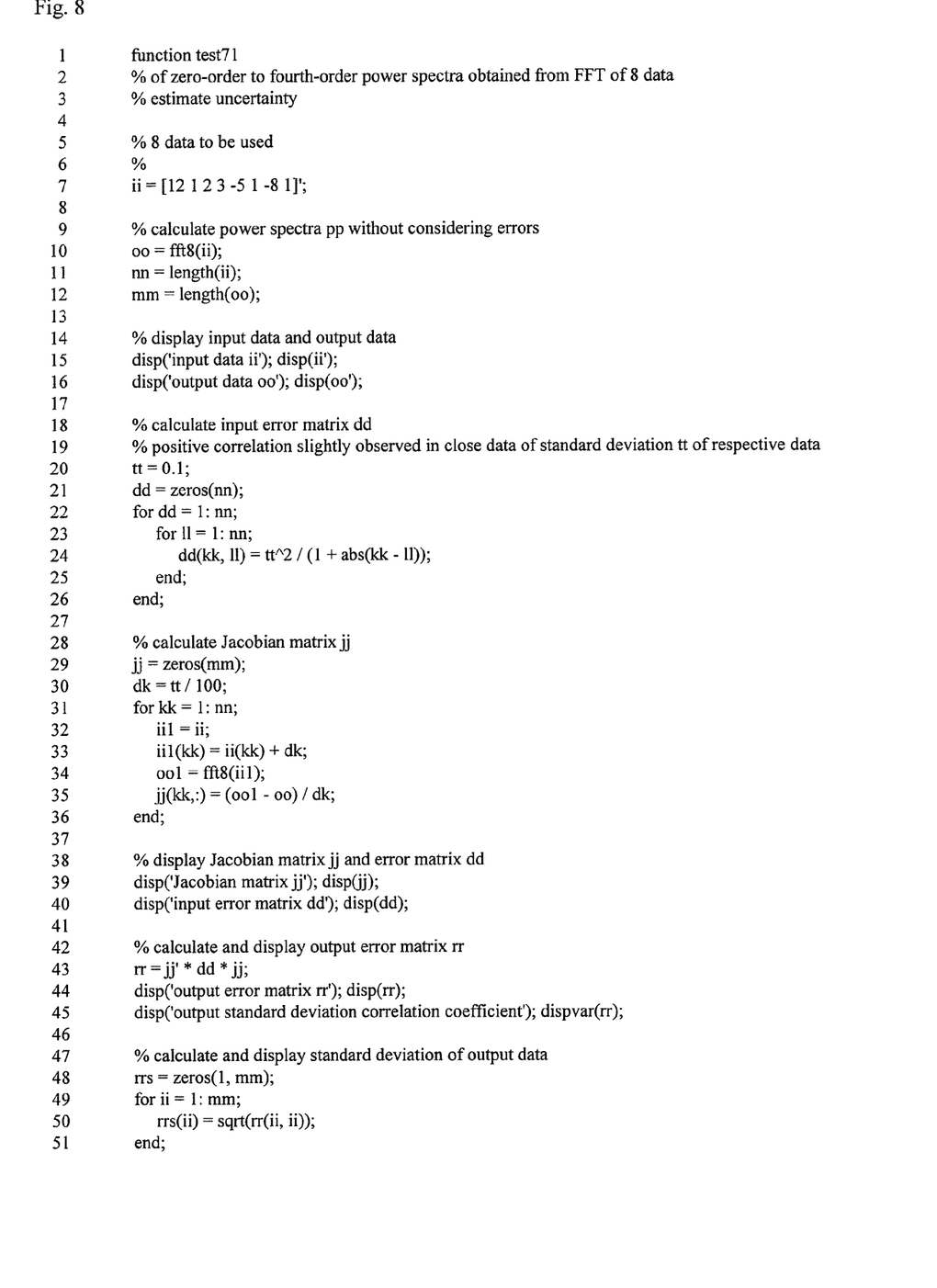
FIG. 8 illustrates a Fourier transform program in which a second embodiment of the present invention is applied to Fourier transform.

In the program of FIG. 8, fft8 (lines 54 to 61) represents data processing to obtain five output data from eight input data, in which it is unnecessary to know details of the processing. When input data ii is provided and a variance-covariance matrix dd of the input data can be estimated, calculation can be performed automatically thereafter. The matrix dd is provided with correlation in which a variance is $0.1^2$ and a covariance is related to a distance of two data (lines 14 to 22).

Figure 9:
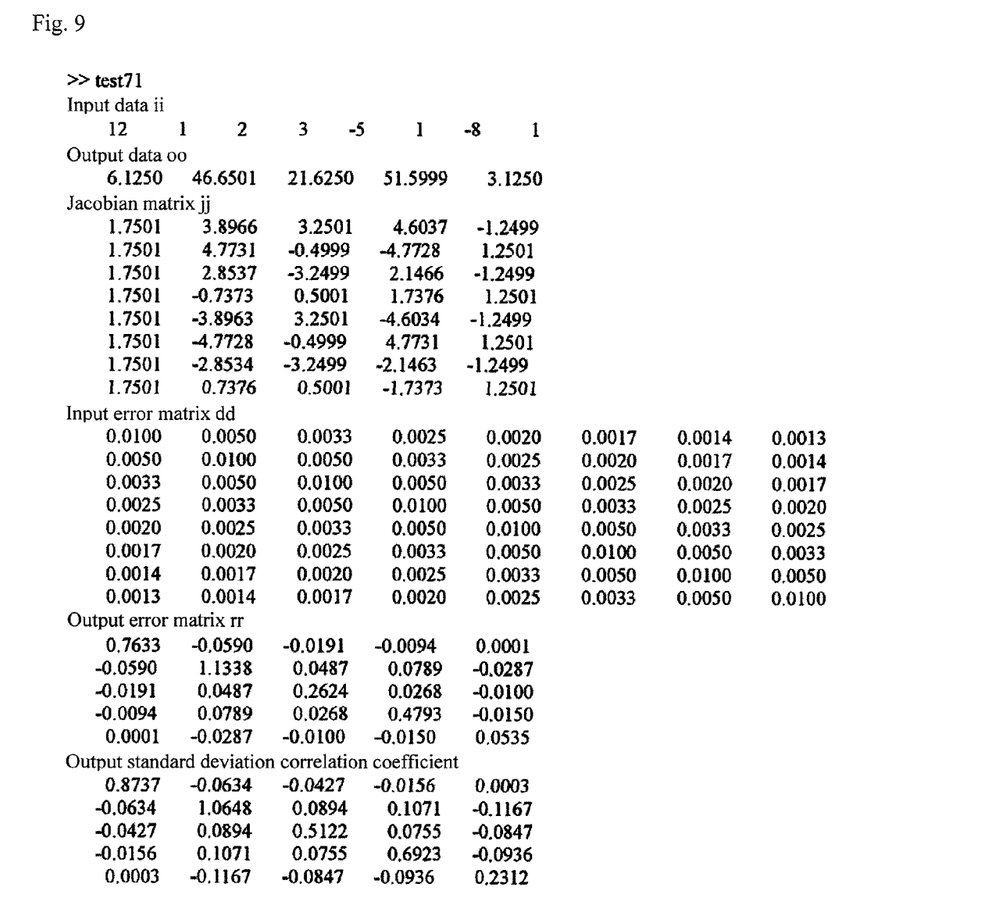
FIG. 9 illustrate an example of input and output data and matrices of the Fourier transform program according to the second embodiment.
Figure 10:
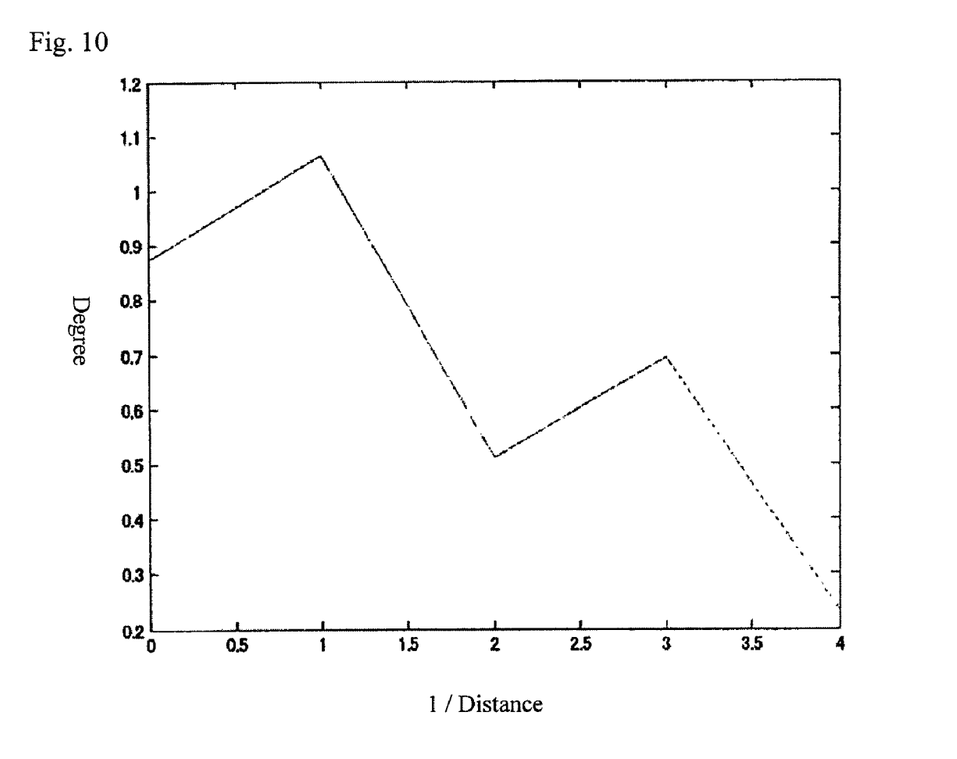
FIG. 10 illustrates an output example according to the second embodiment.

Lines 28 to 52 can be completely automatically calculated. For any data processing, the calculation can be performed on the same program. An example of input and output data and matrices of the program is shown in FIG. 9; an output example is shown in FIG. 10. The results demonstrate that large errors exist in output data of high order and that low-order errors are relatively large. It is assumed that correlation coefficients of the output data errors are not substantially large because FFT is linear processing.

Figure 11:
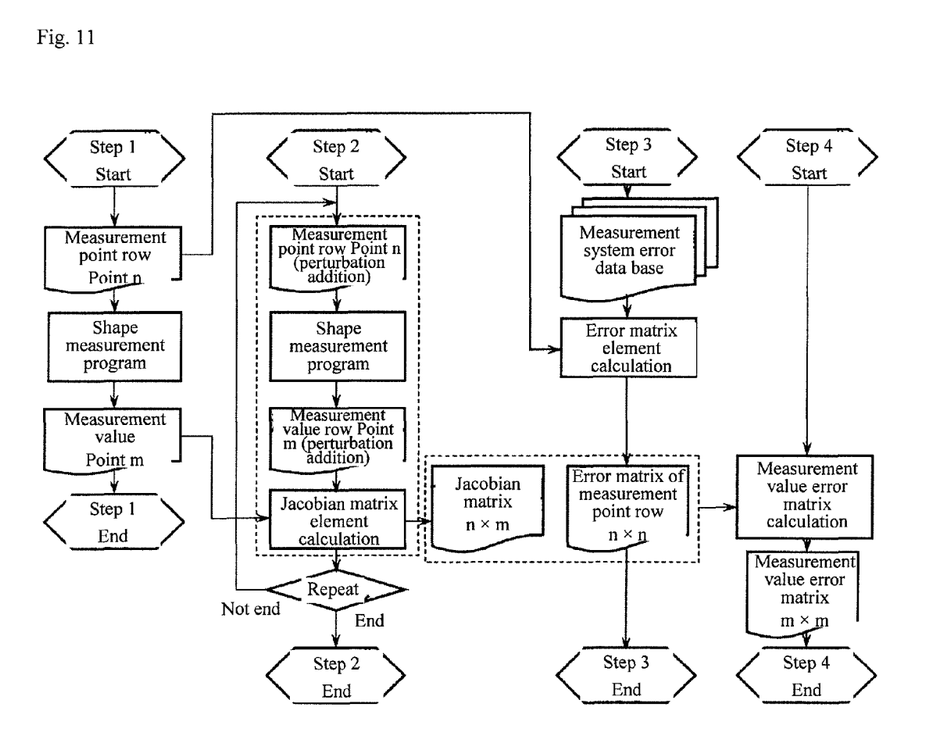
FIG. 11 is a flow chart illustrating processing procedures of a third embodiment of the present invention, which is applied to shape measurement by condition search.

FIG. 11 illustrates processing procedures of the third embodiment of the present invention, which is applied to shape measurement by condition search.

When shape measurement is performed using a three-dimensional measuring machine or a shape measuring machine, for instance, evaluation methods used other than a least squares method include a minimum zone method. In the minimum zone method, only a limited number of representing points, which are employed through condition search, determine results. Other discarded measurement points, however, do not contribute to the results. It is thus difficult to statistically evaluate calculation processes. Research is limited on theoretical studies of measurement uncertainty, and only Related Art 9 can be listed. The research proposes a method of statistically estimating uncertainty in the minimum zone method and establishes theoretical methodology.

In commercially available software employing the minimum zone method, however, no information is disclosed about details on internal algorithms and numerical computations. Even in the case, measurement uncertainty of the minimum zone method can easily be estimated by applying the method of estimating uncertainty according to the present invention. In addition to the minimum zone method, the method of the present invention can be applied to a complicated data processing program combining a plurality of calculation steps.

Figure 12:
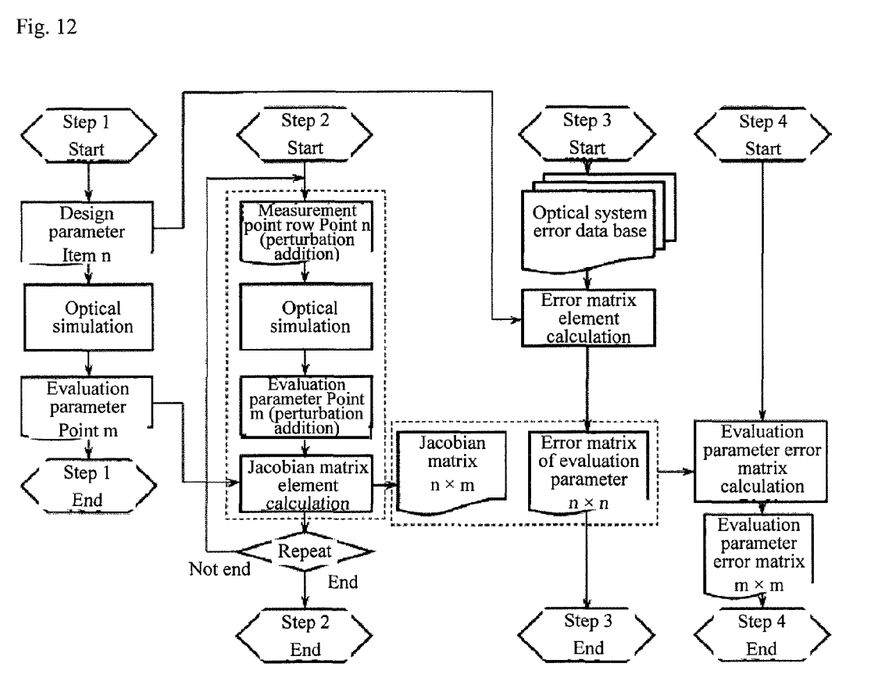
FIG. 12 is a flow chart illustrating processing procedures of a fourth embodiment of the present invention, which is applied to an optical simulation.

FIG. 12 illustrates processing procedures of the fourth embodiment of the present invention, which is applied to an optical simulation.

With downsizing of equipment and upgrading of functions, designing optical elements, such as lenses and the like, and designing a system combining the elements have been getting complicated, for instance. Further, various researches have been performed on implementation of a variety of elements having non-linear optical effects, and optical resonators having a complex shape and optical characteristics. For appropriate designing of the optical elements and the system incorporating the elements, simulation tools are vital that enable physical optical description of behaviors in an optical electromagnetic field from a light source to final optical output.

Meanwhile, depending on condition settings of an optical field specific to an analyzed object or input parameters instructed by an operator, different algorithms and resolution methods which are faster and sufficient in numerical precision are automatically or manually used accordingly, inside commercially available optical simulation tools. The internal information of simulation programs is not entirely disclosed to users. Users thus use the programs as a so-called black box, without understanding internal processing of the simulation that users perform.

Uncertainty of output values can be estimated by obtaining, from numerical differences, the Jacobian matrix of input and output of black box processing, which is one of the features of the present invention that "evaluates precision of calculation results based on error propagation," and by combining the results with the error matrix.

Setting a tolerance in assembling an imaging lens system can be described as an example.

Figure 13:
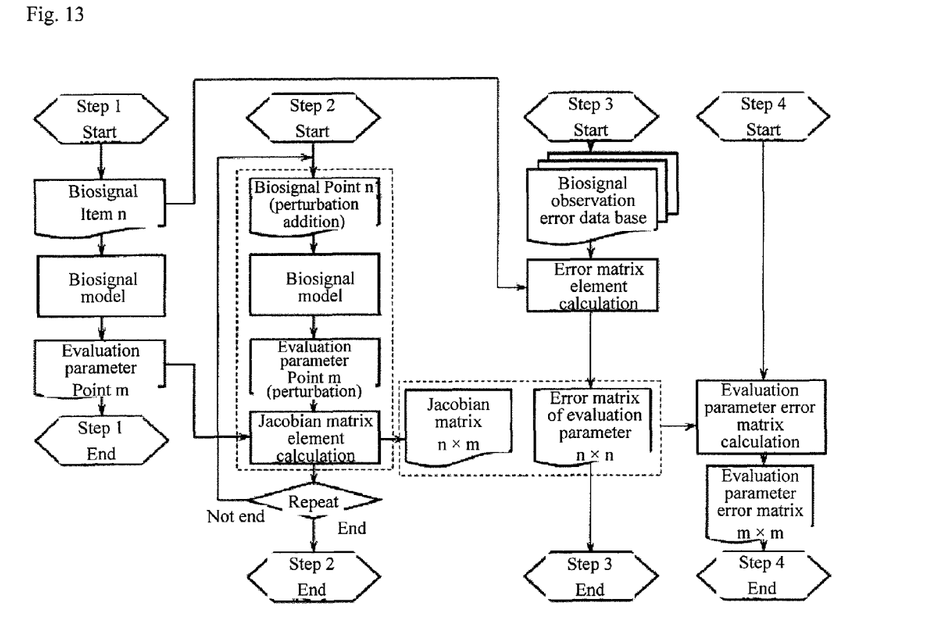
FIG. 13 is a flow chart illustrating processing procedures of a fifth embodiment of the present invention, which is applied to biosignal measurement.

FIG. 13 illustrates processing procedures of the fifth embodiment of the present invention, which is applied to biosignal measurement.

Monitoring drivers behind the wheel, for example, is considered an important technical issue in view of prevention of accidents arising from drowsiness, fatigue, and the like. While it is strongly required to noninvasively detect human biosignals, it is demanded to achieve high reliability as a secure and safety tool. Highly reliable monitoring of drivers is performed based on biosignals, which are intricately sensitive to disturbances and inherently indicative of fluctuations. Modeling and verification are performed for quantifying consciousness of the drivers, for instance.

Under noninvasive conditions, types of biosignals available for monitoring drivers are very limited. Examples include heartbeat, breath, cutaneous temperature, myopotential, and behavior of pupils and eyelids or a portion from neck to head. It is considered that a single signal or a combination of signals are used as input signals of a biological model, so as to establish modeling of consciousness as output and signal processing algorithms required therefor.

Uncertainty of output values can be estimated by obtaining, from numerical differences, the Jacobian matrix of input and output of black box processing, which is one of the features of the present invention that "evaluates precision of calculation results based on error propagation," and by combining the results with the error matrix.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A method of evaluating precision of output data based on error propagation, comprising:
    performing, by a processor, numerical differentiation using input data in data processing, to obtain a Jacobian matrix J of the data processing;

estimating, by the processor, variance-covariance of errors of the input data, to obtain an error matrix D of the input data; and calculating, by the processor, an error matrix R from the Jacobian matrix J and the error matrix D of the input data, the error matrix R representing variance-covariance of errors of output data.

2. The method of evaluating precision of output data according to claim 1, wherein the Jacobian matrix of the data processing is obtained by:

changing, by the processor, only a $k^{th}$ element of an input data string I by a slight amount $d_k$, to prepare an input data string $I_k$, k is a natural number selected from $1 \le k \le a$ number of elements of the input data string I;

performing, by the processor, data processing for the input data string $I_k$, to obtain an output data string $O^*$; and using, by the processor, a difference of each element of O and the output data string $O^*$, and $d_k$, and obtaining elements $j_{k,1}$ to $j_{k,m}$ on row k of the Jacobian matrix J, wherein O is an output data corresponding to the input data string I, m is a number of elements of the output data string O and $O^*$, and l is a natural number of $1 \le l \le m$.

3. The method of evaluating precision of output data according to claim 1, wherein when input data errors are respectively independent and a standard deviation t thereof is known, the error matrix D of the input data is obtained, such that on-diagonal elements of the error matrix D are squares (variances) of the standard deviation of the respective errors; and that off-diagonal elements are 0s.

4. The method of evaluating precision of output data according to claim 1, wherein, when input data errors are not independent, but a correlation coefficient s of two input data and a standard deviation t of the errors can be estimated, the error matrix D of the input data is obtained by calculating a covariance from the correlation coefficient s and the standard deviation t, such that on-diagonal elements of the error matrix D are squares (variances) of the standard deviation of the respective errors, and off-diagonal elements are covariances of two corresponding input data.

5. The method of evaluating precision of output data according to claim 1, wherein the error matrix R of output data is calculated from the Jacobian matrix J and the error matrix D of the input data in an expression below:

$$R = J^t D J$$

(where $J^t$ represents an on-diagonal matrix of the Jacobian matrix J).

* * * * *